(12) United States Patent
Maeda et al.

(10) Patent No.: US 6,207,720 B1
(45) Date of Patent: Mar. 27, 2001

(54) HYDROLYZABLE SILANE EMULSIONS AND METHOD FOR PREPARING THE SAME

(75) Inventors: Toshiko M. Maeda, Sao Paulo (BR); Antonio Chaves, White Plains, NY (US)

(73) Assignee: Crompton Corporation, Greenwich, CT (US)

( * ) Notice: Subject to any disclaimer, the term of this patent is extended or adjusted under 35 U.S.C. 154(b) by 0 days.

(21) Appl. No.: 09/344,768

(22) Filed: Jun. 25, 1999

(51) Int. Cl.[7] .............................. B01F 3/10; B01F 17/34; C09K 3/18
(52) U.S. Cl. ............... 516/73; 106/287.13; 106/287.16; 516/74; 516/76; 516/925; 516/928
(58) Field of Search .................................. 516/73, 74, 76, 516/925, 928; 106/287.13, 287.16

(56) References Cited

U.S. PATENT DOCUMENTS

| | | | |
|---|---|---|---|
| 4,620,878 | 11/1986 | Gee | 106/287 |
| 4,814,376 * | 3/1989 | Tanaka et al. | 516/76 X |
| 4,877,654 * | 10/1989 | Wilson | 106/287.13 X |
| 5,091,002 | 2/1992 | Schamberg et al. | 106/2 |
| 5,196,054 * | 3/1993 | Schmuck et al. | 106/287.16 X |
| 5,226,954 * | 7/1993 | Suzuki | 106/287.13 X |
| 5,302,657 * | 4/1994 | Huhn et al. | 516/76 X |
| 5,338,352 * | 8/1994 | Breneman et al. | 106/287.16 X |
| 5,393,330 | 2/1995 | Chen et al. | 106/2 |
| 5,443,627 * | 8/1995 | Von Au et al. | 106/287.16 X |
| 5,449,712 * | 9/1995 | Gierke et al. | 516/76 X |
| 5,531,812 * | 7/1996 | Montigny et al. | 516/74 X |
| 5,686,523 | 11/1997 | Chen et al. | 524/547 |
| 5,714,532 | 2/1998 | Osterholtz et al. | 524/114 |
| 5,746,810 * | 5/1998 | Suzuki | 516/76 X |
| 5,851,431 * | 12/1998 | Ishikawa et al. | 516/74 |

* cited by examiner

*Primary Examiner*—Richard D. Lovering
(74) *Attorney, Agent, or Firm*—Shirley S. Ma, Esq.

(57) ABSTRACT

The present invention relates to a process of preparing emulsions of hydrolyzable silanes, such as alkoxysilanes, using an oil concentrate. The emulsifiers are initially stirred with water. An oil concentrate is then prepared by adding a hydrolyzable silane to the stirring mixture of emulsifiers and water. Additional water is then dispersed in the oil concentrate to form the desired emulsion. Emulsions prepared by this process have shelf stability that is 6 months or longer.

20 Claims, No Drawings

US 6,207,720 B1

HYDROLYZABLE SILANE EMULSIONS AND METHOD FOR PREPARING THE SAME

FIELD OF THE INVENTION

The present invention relates to a method of preparing hydrolyzable silane emulsions using an oil concentrate. The emulsifiers are free of silicone oil.

The emulsifiers are initially stirred with water. An oil concentrate is then prepared by adding a hydrolyzable silane to the stirring mixture of emulsifiers and water. Additional water is then dispersed in the oil concentrate until an inversion occurs, forming the desired oil-in-water emulsion. Emulsions prepared by this process have shelf stability that is greater than six months.

BACKGROUND OF THE INVENTION

Generally, emulsions of hydrolyzable silanes, such as alkoxysilanes, are difficult to prepare due to hydrolysis and condensation of the alkoxysilanes during the emulsification process and upon aging. Previously, emulsions of hydrolyzable silanes have been prepared by combining the silane with the emulsifiers to form a homogeneous mixture followed by addition of water at very high speeds. Extensive premature hydrolysis of the silane is prevented by controlling the pH near neutral. Alternatively, the emulsifiers were added to the water followed by the silane and homogenization of the mixture.

Wilson, U.S. Pat. No. 4,877,654 (issued Oct. 31, 1989), describes aqueous emulsions useful for rendering porous substrates water repellent comprising (a) a hydrolyzable silane, essentially hydrolytically stable within a determinable pH range, emulsifier(s), and water. The emulsion is prepared by adding the alkoxy silane and emulsifiers to a Waring® Blender, and then slowly adding water as the speed of mixing is increased. A buffer is added to maintain the pH within a determinable pH stable range. However, the high speeds of a Waring Blender mixer are not practical for large commercial preparations.

Schamberg et al., U.S. Pat. No. 5,091,002 (issued Feb. 25, 1992), describes an aqueous emulsion useful for water-repellent impregnation of porous mineral building materials comprising an emulsion of a mixture of an alkoxysilane and a alkoxypolysiloxane, an emulsifier, and water.

The emulsion is prepared by adding the emulsifiers to the water. The alkoxysilane is then added with stirring and the mixture is homogenized with a gap-type homogenizer. Alternatively, the emulsion is prepared by mixing the silane and the emulsifier with or without an extremely small amount of water, specifically 5–10% by weight of the surfactant, and then adding the total required amount of water.

Von Au et al., U.S. Pat. No. 5,443,627 (issued Aug. 22, 1995) describes emulsions having organopolysiloxane free from basic nitrogen, alkyltrialkoxysilane, an emulsifier and water. The emulsions are prepared by conventional methods for preparing aqueous emulsions. Preferably, some of the water is emulsified with the organopolysiloxane, the alkyltrialkoxysilane and the emulsifier until a viscous oil phase is formed, and subsequently, the remaining water is emulsified again to form a less viscous emulsion.

Suzuki, U.S. Pat. No. 5,226,954 (issued Jul. 13, 1993), describes an aqueous emulsion of a monoalkyltrialkoxysilane and/or condensate thereof, an emulsifier mixture of an anionic emulsifier and a non-ionic emulsifier which are stable for long periods of time and which have excellent waterproofness. The emulsion is prepared by mixing the silane with surfactants and then adding water slowly while stirring at a high rate of greater than 1000 rpm.

Suzuki, U.S. Pat. No. 5,746,810 (issued May 5, 1998), describes an aqueous emulsion of alkylalkoxysilane, water and an emulsifier, which has a stable emulsion state for a long period of time. The emulsion is prepared by emulsifying the alkylalkoxysilane, water, the emulsifier, and optionally, other additives, with an emulsifying and dispersing machine under conditions sufficient to form an emulsion in which droplets of the alkylalkoxysilane in the water has a diameter in the range of from 0.5 to 10 μm.

Chen et al., U.S. Pat. No. 5,393,330 (issued Feb. 28, 1995), describes masonry water repellents comprising aqueous emulsions of alkylalkoxysilanes with either a quaternary ammonium surfactant or a mixture of a quaternary ammonium surfactant with an amino and/or nonionic surfactant. The emulsions are typically prepared by mixing the surfactant(s) with the alkyltrialkoxysilane(s), adding water, and blending.

Chen et al., U.S. Pat. No. 5,686,523 (issued Nov. 11, 1997), describes a stable silane containing composition comprising (I) a water insoluble or slightly soluble alkoxy silane, (II) an emulsifier, (III) water, and (IV) a water dispersible or emulsified polymer containing an alkoxy silane functional group. Precursor silane emulsions are prepared by mixing emulsifier (II) with alkoxy silane (I), adding water (III) and stirring. The precursor alkoxy silane emulsion is added to the reactive dispersion polymer (IV) or to a reactive polymer emulsion comprising (II), (III) and (IV). The method employed to mix these components is not critical and any commonly used low shear equipment is suitable. Mixing may occur before packaging and storage, or immediately before use, as in the case of a two part system.

Osterholtz et al., U.S. Pat. No. 5,714,532 (issued Feb. 3, 1998), describes a stable epoxy silane emulsion and method for preparing the same. The composition comprises (I) a water insoluble or slightly soluble epoxysilane; (II) an emulsifier; (III) water and (IV) a water dispersible polymer containing a functional group with an active hydrogen. Precursor epoxysilane emulsions are prepared by mixing emulsifier (II) with epoxy functional silane (I), adding water (III) to the mixture and stirring. The precursor epoxy silane is then added to the reactive polymer (IV), or to a reactive polymer emulsion which can comprise (II), (III) and (IV). The method employed to mix these component is not critical.

SUMMARY OF THE INVENTION

The present inventors have now found a process of preparing a hydrolyzable silane emulsion composition comprising a water insoluble or slightly soluble silane, at least one emulsifier, and water, which utilizes an oil-in-water inversion process. The resultant alkoxy silane emulsion exhibits excellent hydrolysis resistance and no appreciable condensation during emulsification or at ambient conditions for extended periods of 6 months or longer, resulting in an emulsion with improved shelf stability.

The emulsion comprises an alkoxy silane of the general formula:

$$R^1{}_a R^2{}_b Si(OR^3)_{4-a-b}$$

where $R^1$ is a hetero atom substituted hydrocarbon group; $R^2$ is independently an unsubstituted hydrocarbon group; $R^3$ is a hydrocarbon group including alkyl, alkoxyalkyl, aryl or aralkyl radicals having from 2 to 10 carbon atoms ; and a is 0 to 3, b is 0 to 2; with the proviso that a+b=1,2 or 3; and each R group is cyclic, branched or linear; at least one emulsifier; and water.

The process of making the inverse emulsions of the present invention comprises dispersing at least one emulsifier in water, adding the hydrolyzable silanes of the present invention to form an oil concentrate, and subsequently adding water to the oil concentrate until what is referred to as an inversion, occurs.

DETAILED DESCRIPTIONS OF THE PREFERRED EMBODIMENTS

The silanes useful herein, are hydrolyzable, and may include those having the general structure $$R^1_a R^2_b Si(OR^3)_{4-a-b} \quad (I)$$

where $R^1$ is a hetero atom substituted hydrocarbon group, $R^2$ is independently an unsubstituted hydrocarbon group; $R^3$ is a hydrocarbon group including alkyl, alkoxyalkyl, aryl or aralkyl radicals having from 2 to 10 carbon atoms; and a is 0 to 3, b is 0 to 2; with the proviso that a+b=1,2 or 3; and each R group is cyclic, branched or linear; at least one emulsifier; and water.

$R^1$ is a heteroatom substituted hydrocarbon group. Examples include monovalent organic radicals linked to the Si atom of the silane by an Si—C bond, and which have one or more ether, ester, carbamate, isocyanate, thioether, polysulfide, blocked mercaptan, amide, cyano, epoxy, or oximato group thereon.

Exemplary ether-containing groups include alkoxyethyl or alkoxypropyl and polyether groups, especially those obtained as a result of hydrosilation of an allyl started poly(ethylene oxide), allyl-started polypropylene oxide or allyl-started ethylene oxide/propylene oxide copolymer. Ether groups may also be provided by etherification of silylalkylhydroxides.

Exemplary ester containing groups are acetate, propionate, octanoate, benzoate, fatty acid or acid terminated polyester, esters of hydroxyalkyl groups, for instance acetyloxypropyl, propionyloxypropyl, benzoyloxyethyl, and the like.

Exemplary carbamate containing groups may be groups obtained by reaction of silylalkylisocyanates with alcohols, and may include polyurethane as well an mono-carbamato structures. Specific such groups include propyl-N-carbamatoethyl; propyl-N-carbamatomethyl, ethyl-N-carbamatoethyl and propyl-N-carbamatoisopropyl.

Exemplary amide containing groups are suitably derived from aminoalkyl groups, amidized with a carboxylate ester such as methyl acetate, methyl propionate or a fatty acid ester, and the like. Specific such groups include 3-acetamidopropyl, 2-propionamidoethyl, 3-cocoamidopropyl.

Polysulfide encompasses groups having the functionality —$S_n$— therein where n is 2–8, preferably 2–4, especially disulfide and tetrasulfide. Specific such groups include: $C_4H_9$—SS—$C_3H_6$— and $C_2H_5$—SS—$C_2H_4$—.

Blocked mercaptans are functional groups produced by reaction of a mercapto group with a subsequently removable blocking agent. Exemplary blocked mercaptan groups include thioester and other groups disclosed in copending application PCT/US98/17391, filed Aug. 21, 1998, designating US.

Representative examples of silanes which may incorporate blocked mercaptan groups include 3-methyldiethoxysilylpropyl thioacetate, 3-trimethoxysilylpropyl thioacetate, 3-triethoxysilylpropyl thioacetate, 3-trimethoxysilylpropyl thiopropionate, 3-triethoxysilylpropyl thiobenzoate; 3-triethoxysilylethyl thioacetate, 3-triethoxysilylmethyl thioacetate, 3-triethoxysilylpropyl thiooctanoate, and other compounds listed in PCT/US98/17391, filed Aug. 21, 1998.

Cyano containing groups are exemplified by 3-cyanoethyl.

Epoxy-containing groups are exemplified by glycidoxypropyl and β-(3,4-epoxycyclohexyl)ethyl.

The $R^1$ groups may also be substituted by a silyl group. For instance, $R^1$, may be a group, —A—W, which comprises a silyl group W and a divalent linking group, A, which is attached by an Si—C bond group W and so a silicon atoms of the Si atom. The divalent linking group A, creates a non-siloxane bridge between the plural silicon atoms of the molecule. The linking group A may contain hetero atoms in the structure so long as Si—C bonds are used at the ends of the linking group to form the respective connections to silicon. The linking group may be linear, branched or cyclic and may be olefinically or aromatically unsaturated. The linking group may be, for instance, alkylene, alkarylalkylene or alkarylene, or it may be alkylene which is interrupted by hetero-atom containing organic structures such as ether, including polyether; ester, including polyester; carbamate, including polyurethane; isocyanurate; thioether; polysulfide, including disulfide and tetrasulfide; or the like. Preferably the linking group is an alkylene of 2 to 12 carbon atoms. The linking group A may be substituted with silyl or siloxy functions, as well as unsaturated groups. Indeed, group A may form part of a backbone with relatively linear siloxane chains attached to either end of the group. Examples of linking groups A include cycloaliphatic groups such as 1,4-diethylenecylclohexylene.

or 1,3,-diethylene-5-triethoxysilylethylcyclohexylene:

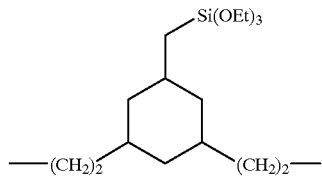

branched or linear aliphatic groups such as ethylene, 1,2-propylene, 1,3-propylene, 1,4-butylene, 1,3-butylene, 1,2-butylene or 2,2-dimethyl-1,3-propylene; arylene groups such as 1,4-phenylene; alkarylalkylene groups such as 1,4-diethylenephenylene:

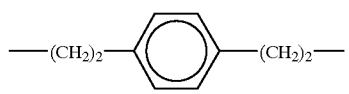

divalent polyether groups of the formula:

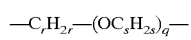

where q is 1–50, preferably 1–5; r and s are integers of 2–6; and divalent thioether or polysulfide-containing groups of the formula:

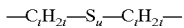

where t is 2–16, preferably 2–4, and u is 1–8, preferably 2–4. Preferably the linking group is an alkylene of 2 to 12 carbon atoms, more preferably 2–3 carbon atoms.

The silyl functional group W in the structure —AW may be a silyl group having hydrolyzable functionality, such as alkoxy. Preferably, the silyl group W is an alkoxysilyl group, more preferably a dialkoxysilyl, and most preferably a trialkoxysilyl group.

A preferred group —A—W may be represented as —C$_f$H$_{2f}$—SiR$^1_g$(X)$_{3-g}$ wherein the structure —C$_f$H$_{2f}$— corresponds to A and the structure —SiR$^2_g$(X)$_{3-g}$ corresponds to W. Suitably, f=2 to 12,g=0 to 2, X is a hydrolyzable group such as alkoxy or aryloxy, and R$^1$ is as previously defined. More preferably f=2 to 6,g=0–1,X is methoxy or ethoxy, and R$^1$ is methyl. Exemplary such groups are —C$_2$H$_4$Si(OCH$_3$)$_3$; —C$_2$H$_4$Si(OC$_2$H$_5$)$_3$; —C$_2$H$_4$Si(OCH$_3$)$_2$ (CH$_3$); —C$_2$H$_4$(C$_6$H$_9$)(C$_2$H$_4$Si(OCH$_3$)$_3$)$_2$; and —C$_2$H$_4$(C$_5$H$_8$)C$_2$H$_4$Si(OC$_2$H$_5$)$_3$.

R$^2$ is an unsubstituted (e.g. with a hetero atom) hydrocarbon group and may be a saturated or an unsaturated aliphatic or aromatic hydrocarbon, e.g. alkyl (linear or branched), cycloalkyl, alkoxy-substituted alkyl, aryl or alkaryl having from 1 to 10 carbon atoms. Exemplary unsubstituted R$^2$ groups are methyl, ethyl, i-propyl, i-butyl, t-butyl, pentyl, cyclohexyl, octyl, decyl, dodecyl, octadecyl, phenyl, benzyl or naphthyl. Methyl, ethyl and phenyl are preferred R$^2$ groups. R$^2$ may also contain ethylenic or acetylenic unsaturation. Examples of such R$^2$ groups include vinyl, allyl, propargyl, styryl, n-octyl, and so forth.

R$^3$ is alkyl, alkoxyalkyl, aryl or aralkyl radicals having from 2 to 10 carbon atoms. Examples include ethyl, n-propyl, n-butyl, n-hexyl, n-heptyl, n-octyl, n-nonyl, n-decyl, and cyclo radicals such as cyclopentyl, cyclohexyl, cycloheptyl, and cyclooctyl. Illustrative of suitable branched chain hydrocarbon radicals for R$^3$ are alkyl radicals such as isopropyl, isobutyl, sec-butyl, t-butyl, sec-amyl, and 4-methyl-2-pentyl. Alkoxyalkyl groups may be exemplified by n-butoxy ethyl and methoxy propyl. Aryl groups may be exemplified by phenyl and aralkyl groups may be exemplified by benzyl or ethylphenyl.

The term insoluble or slightly soluble silanes includes those silanes having solubilities of less than about 8.0 weight percent in water. Water insoluble silanes are preferred. However, water soluble silanes are specifically excluded from these silanes because compositions made with such silanes are not stable for extended periods of time, i.e., more than two to three days at ambient conditions.

The silanes typically have a viscosity of about 0.5 to about 15 centistokes at room temperature.

Specific examples of suitable silanes include β-(3,4-epoxycyclohexyl)ethyltriethoxysilane, 4-(methyldiethoxysilyl)-1,2-epoxycyclohexane, 3-(3,4-epoxycyclohexyl)-propyltri(isobutoxy)silane, 3-(2,3-epoxybutoxy)propyltriethoxysilane, [2.2.1] bicycloheptane 2,3-epoxy-5-(2-triethoxysilyl)ethyl, β-(3,4-epoxycyclohexyl)ethyltriisopropoxysilane, β-(3,4-epoxycyclohexyl)-ethyltriisobutoxysilane, 3-glycidoxypropyltriisobutoxysilane, 3-methacryloxypropyltriethoxysilane, 3-methacryloxypropyltriisopropoxysilane, 3-methacryloxypropyltriethoxysilane, 3-mercaptopropyltriethoxysilane, vinylmethylbis-(isopropoxy)silane, 3-methacryloxypropylmethyldibutoxysilane, and bis or tris silanes such as 1,2 bis-(alkoxy)silyl ethanes and tris(3-triethoxysilylpropyl) isocyanurate.

A preferred group of silanes are the epoxy functional silanes including, but not limited to, those described by Brison and Lefort in French Patent No. 1,526,231. Preferred epoxy functional silanes may be illustrated by the formulas:

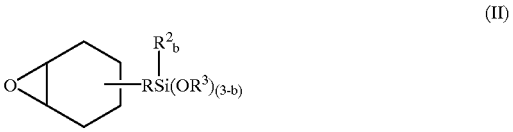

(II)

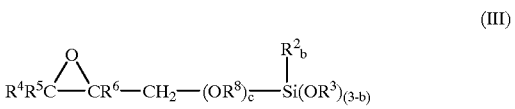

(III)

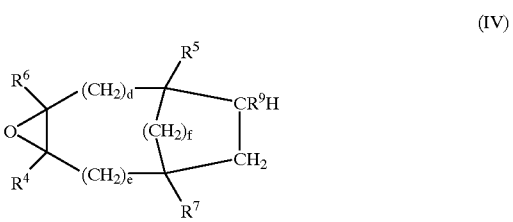

(IV)

where R is —(CH$_2$)$_m$—, where m has a value of zero to six; R$^3$ is an alkyl, alkoxy-substituted alkyl, aryl or aralkyl group, each of said groups having from two to ten carbon atoms; R$^4$, R$^5$, R$^6$ or R$^7$ are each hydrogen or an alkyl group having from one to six carbon atoms; R$^8$ is an alkyl group having from one to four carbon atoms or aralkyl or aryl group having six to ten carbon atoms; R$^9$ has the general formula

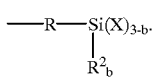

X is OR$^3$, R$^3$ is defined as above, R$^2$ is defined as above; b has a value of zero, one or two; c, d and e each have a value of zero or one; and f has a value of zero, one or two.

More specifically, R$^2$ denotes a substituted monovalent hydrocarbon group exemplified by alkyl groups (e.g., methyl, ethyl, isobutyl, and octyl groups), alkenyl groups (e.g., vinyl and allyl groups), aryl groups (e.g., phenyl, tolyl and naphthyl groups), and aralkyl groups (e.g., benzyl and 2-phenylethyl groups), and so forth.

R$^4$, R$^5$, R$^6$ or R$^7$ are hydrogen atoms or monovalent hydrocarbon groups having 1 to 6 carbon atoms exemplified by alkyl groups (e.g., methyl, ethyl, propyl, isopropyl, n-butyl and isobutyl groups), alkenyl groups (e.g., vinyl and allyl groups), and aryl groups (e.g., phenyl group). These hydrocarbon groups may be substituted by halogen atoms and functional groups, including cyano and epoxy, for a part or all of the hydrogen atoms therein.

The silanes of the present invention are useful from about 0.1 to about 60 weight percent based on the total weight of the emulsion.

Mixtures of these silanes may be employed in the practice of this invention in so as not to venture from the spirit and scope of the invention.

The emulsifiers, or surfactants, for use herein include nonionic, anionic, cationic, and amphoteric surfactants or mixtures thereof.

Examples of the nonionic surfactants include polymers of alkylene oxides including ethylene oxide, polyoxyethylene alkyl ethers, polyoxyethylene alkyl phenyl ethers, polyoxyethylene fatty acid esters, sorbitan fatty acid esters, polyoxyethylene sorbitan fatty acid esters.

More specifically, the nonionic surfactants may include glycerol monostearate, glycerol monooleate, sorbitan monolaurate, sorbitan monopalmitate, sorbitan monostearate, sorbitan tristearate, sorbitan monooleate, sorbitan trioleate, sorbitan monosesquioleate, polyoxyethylenesorbitan tristearate, polyoxyethylenesorbitan monooleate, polyoxyethylenesorbitan trioleate, polyoxyethylenesorbitol tetraoleate, polyoxyethylenelauryl ether, polyoxyethyleneoleyl ether, polyoxyethylene higher alcohol ether, polyoxyethyleneoctylphenyl ether, polyoxyethylenephenyl ether, and so forth.

Fluorine or silicone nonionic emulsifiers may also be utilized in the present invention including polyoxyalkylene-modified polydimethylsiloxane, fluorinated alkyl-containing polyalkyleneoxides, and so forth, although such emulsifiers are not preferred as they may have deleterious effects on the final product, especially emulsions utilized as coatings.

The anionic surfactants useful herein include fatty acid salts, alkyl sulfate ester salts, alkyl benzene sulfonate, alkyl phosphate, alkylallyl sulfate ester salt, and polyoxyethylene alkylphosphate ester.

Specifically, anionic surfactants include sodium lauryl sulfate, triethanolamine lauryl sulfate, ammonium lauryl sulfate, sodium dodecylbenzene sulfonate, sodium alkylnaphthalene sulfonate, sodium dialkylsulfosuccinate, sodium alkyldiphenylether disulfonate, diethanolamine alkylphosphate, potassium alkylphosphate, sodium polyoxyethylenelaurylether sulfate, sodium polyoxyethylenealkylether sulfate, triethanolamine polyoxyethylenealkylether sulfate, sodium alkane sulfonate, mixed fatty acid sodium soap, semi-hardened beef tallow fatty acid potassium soap, sodium stearate soap, potassium oleate soap, castor oil potassium soap, higher alcohol sodium sulfate, sodium salt of β-naphthalenesulfonic acid formalin condensate, special aromatic sulfonic acid formalin condensate, special aromatic sulfonic acid formalin condensate, special aromatic sulfonic acid formalin condensate, special carboxylic acid type surface active agent, special polycarboxylic acid type high molecular weight surface active agent, and so forth.

Examples of the cationic surfactants include quaternary ammonium salts such as long chain alkyl trimethylammonium salts, long chain alkyl benzyl dimethyl ammonium salts, and di(long chain alkyl) dimethyl ammonium salts.

A further listing of surfactants useful in the present invention may be those described in 1998 McCutcheon's Vol. 1: *Emulsifiers and Detergents,* North American Edition (The Manufacturing Confectioner Publishing Co., Glen Rock) 1998, which is incorporated herein by reference.

The emulsifiers may be soluble or insoluble in the neat silane.

The appropriate HLB (hydrophilic-lipophilic balance) of the surfactants is chosen to correspond to the HLB of the specific silane being emulsified. The method for selecting the optimum HLB for a substance is well known to one skilled in the art and described in "The HLB System" published by ICI Americas Inc., in Wilmington, Del. The HLB classification of surfactants is based on molecular structure and can therefore be used to predict behavior of single molecules.

However, preferably, for the oil-in-water emulsion of the present invention, the HLB of the emulsifier(s) will be from about 1.5 to about 20, more preferably from about 4 to 17, and most preferably from about 9 to 12. Blends of emulsifiers are also useful providing that the HLB of the resultant blend remains within the desirable ranges. For instance, if an emulsifier with an HLB of less than 1.5 is utilized, then an emulsifier with a high HLB should be utilized also, or if an emulsifier with an HLB of greater than 20 is utilized, it should be used in combination with one having a low HLB so to bring the HLB within a useable range.

Preferred emulsifiers include sorbitan monostearate (HLB=4.7), POE(20) sorbitan monooleate (HLB=15.0), and secondary alcohol ethoxylate. The selection of the emulsifier will depend on the silane being utilized, however.

Blends of emulsifiers may be utilized to obtain the desired HLB for the silane that is being emulsified. An emulsifier may have an HLB that is higher or lower, so long as the HLB of the resultant blend is within the desired range.

The emulsifiers are present in the oil concentrate at about 1 part to about 28 parts per 100 parts of the alkoxysilane.

To reduce the extent of hydrolysis and condensation of the silane, the pH should be maintained between about 5.5 and about 8.5. The pH of the total composition may impact upon the hydrostability. If the pH is allowed to drift outside of this range, the rate of hydrolysis and condensation of the silane will increase and will result in shorter shelf lives.

High acidity or high alkalinity catalyzes the hydrolysis and condensation of the alkoxysilyl group of the epoxy silane. The closer the pH of the composition is to neutral (i.e. pH=7), the better the stability of the emulsion. Therefore, the preferred range of pH of the total composition is about 5.5 to about 8.5. Substances which can be used to adjust the pH are organic or inorganic buffers including sodium acetate, sodium citrate, sodium carbonate, sodium bicarbonate, sodium hydrogen phosphate, sodium dihydrogen phosphate, and the corresponding potassium salts.

Broadly, the preparation of the oil concentrate involves dispersing a surfactant in water, adding the hydrolyzable silane which forms an oil concentrate, sometimes referred to in the art as a "grease", and then slowly adding additional water to the oil concentrate until an inversion occurs forming the desirable oil-in-water type emulsion.

Initially, in the first step in preparing the oil concentrate, emulsifiers and water are mixed at a weight ratio of about 1.5:1.0 to about 1.0:4.0, preferably from about 1.0:1.0 to about 1.0:3.0 emulsifier to water.

The hydrolyzable silane of the present is then added to the emulsifier/water mixture to form the greasy or paste-like oil concentrate. The resultant oil concentrate may contain from about 1 part to about 55 parts water, and preferably from about 10 to about 25 parts water per 100 parts silane, and about 1 part to about 28 parts emulsifier, and preferably from about 5 parts to about 15 parts emulsifier per 100 parts silane.

The oil concentrate typically has a viscosity of about 100,000 cPs or greater, and more typically from about 100,000 to about 3,000,000 cPs as measured by a Brookfield HB Series Viscometer with a Helipath STand and a TA spindle. The high viscosity oil concentrate will allow the mixture to be sheared with a lower amount of energy. If too much water is added at this initial stage, the subsequent oil concentrate will have a viscosity which is too low and sufficient shearing of the oil concentrate will not be possible unless very high energy is used. The lower energy input permits the shearing to be done with industrial size mixers or stirrers.

In the case where at least one of the emulsifiers was a solid, the emulsifier(s) may be melted while mixing and the initial water was then added to the melted emulsifiers. The amount of water added in this initial stage is similar to the previous case which had only liquid emulsifiers. To prevent re-solidification of the emulsifiers, the water added at this initial stage was heated above the eutectic point of the mixture before adding to the emulsifiers. The emulsifier/water mixture was allowed to cool to between about 0° C. to about 45° C. and preferably to less than 35° C. before the alkoxysilane was added to minimize hydrolysis of the alkoxysilane during the process. Then, the alkoxysilane was added slowly so that it was incorporated into the emulsifier mixture to form the oil concentrate.

Water is then dispersed in the oil concentrate forming the desired oil-in-water type emulsion. Water is added slowly at first until the emulsion thins out. This is commonly called the inversion of the emulsion. The inversion typically occurs somewhere between about 52 to about 59 parts water per 100 parts of the silane (or at about 56 parts water plus or minus about 3 parts). The oil concentrate may be dispersed in water in a number of mechanical means known to the art. Such mechanical means may include various power driven stirrers, ultrasonic mixers, blenders, colloid mills, homogenizers, or in-line mixers. Typically, a stirrer or mixer is used.

The emulsions of the present invention are free from siloxane, or silicone oil. The viscosity of the final emulsion is about 1 to about 18 cPs, preferably about 6 to about 12 cPs, with 8 cPs being the most preferred. The particle size of the resultant emulsion is less than about 1 $\mu$m, preferably from about 0.04 to about 1 $\mu$m, with an average particle size being about 0.3 $\mu$m.

The emulsions of the present invention are useful as hydrophobizers, crosslinkers, dispersing aids, adhesion promoters, surface modifiers, coatings, coupling agents, and so forth.

Coupling agents are used in many applications including foundry resins, filled components, mineral treatments, paints, pigment dispersants, and so forth.

The compositions of the present invention are also useful for any types of materials utilized in the construction and civil engineering industries where water repellency or waterproofness is desired. This include materials such as masonry and wood products, including brick, paving material, asphalt, cement, plaster, molding, roofing tile, stucco, magnesia cement, insulation including both electrical and thermal insulators, porcelain such as that used for spark plugs, stone, tile, faux stone, adobe, concrete, masonite, mineral board, particle board, gypsum, and so forth.

The emulsions of the present invention may be utilized on common brick, paving brick, face brick, asphalt, cement, concrete, reinforced concrete, and so forth such as used in roadways, parking lots, parking ramps, stadiums, bridges and so forth. They may be utilized in drainage systems on sewer pipes and for drain tiles.

In the construction of new buildings, the emulsions may be utilized on the foundation blocks, for roofing tile, flue lining, cement, conduit, gypsum board, molding, plaster, stucco, insulation, diatomaceous earth, adobe, stone, faux stone, porcelain and so forth.

For mixables, the emulsions may be incorporated into such things as cement or concrete prior to casting and setting.

The emulsions may be utilized on wood and wood products including particle board and mineral board as used in new construction, for instance.

The compositions of the present invention are not limited to those applications listed herein, but rather this is only an illustrative list.

The compositions may be applied to a substrate by any common application methods including rolling, spraying, extruding, brushing, and so forth, or they may be incorporated into sizing, adhesive or sealant formulations.

Antibacterial compounds or biocides may be added to the compositions to improve their resistance to fungi growth. One of skill in the art is familiar with the biocidal agents which may be utilized, but included in this group are diazolidinyl urea, methyl paraben, ethyl paraben, propyl paraben, butyl paraben, 2-bromo-2-nitro-propane-1,3-diol, etc., and combinations thereof. A further listing of biocidal agents useful in the present invention may be those described in 1998 McCutcheon's Vol. 2; *Functional Materials*. Such additives are typically useful from about 0.1 to about 5% by weight based on the composition.

Other optional ingredients include pH buffers, fragrances, pigments, dyes, thickeners, foaming agents, anti-foaming agents, and so forth.

The following non-limiting examples further illustrate the hydrolyzable silane based emulsions of the present invention.

EXAMPLES

Example 1

A mixture of 2 parts SPAN 60 (sorbitan monostearate) and 2 parts TWEEN 80 (polyoxyethylene(20) sorbitan monooleate), both available from ICI in Wilmington, Del., were warmed with a water bath at 70° C. to melt the solid surfactant. The mixture was stirred with a Cowles disperser at 1700 rpm, and 3 parts of warm water was added to the stirred mixture over a 3 minute period to obtain a uniform dispersion. An additional 3 parts water was added at ambient temperature. To this uniform dispersion was added 40 parts of 2-(3,4-epoxycyclohexyl)ethyl-triethoxysilane in several portions. The mixture was stirred well after every addition. After all of the silane was incorporated, the oil concentrate appeared to be a greasy paste. To this oil concentrate was added 49 parts of water with constant stirring to give a white emulsion which was stable for greater than 6 months. Germaben II, 1 part, was added as a biocide.

Example 2

A mixture of 2 parts Span 60 (sorbitan monostearate) and 2 parts Tween 40 (polyoxyethylene(20) sorbitan monopalmitate) was warmed with a water bath at 70° C. to melt the solid surfactant. The mixture was stirred with a mechanical stirrer at 1700 rpm, and 3 parts warm water was added to the stirred mixture over a 3 minute period to obtain a uniform dispersion. An additional 3 parts water was added at ambient temperature. To this uniform dispersion was added 40 parts of 2-(3,4-epoxycyclohexyl)ethyl-triethoxysilane in several portions. The mixture was stirred well after every addition. After all of the silane was incorporated, the oil concentrate appeared to be a greasy paste. To this oil concentrate was added 49 parts of water with constant stirring to give a white emulsion. Germaben II, 1 part, was added as a biocide.

Example 3

A mixture of 15.5 parts Tergitol® 15-S-3 (3 mole EO) and 9.5 parts Tergitol® 15-S-15 (15 mole EO), both $C_{11}$ to $C_{15}$ secondary alcohol ethoxylates available from Union Carbide Corp. in Danbury, Conn. were mixed together using mechanical stirring means at about 1700 rpm, and 40 parts water was then added and mixed until a uniform dispersion resulted. Bis(3-triethoxysilylpropyl) disulfide, 200 parts, was slowly added to the mixture which was stirred well. After addition of the silane, the oil concentrate results having a greasy, paste-like appearance. Water, 235 parts, was then added with constant stirring until inversion and a white emulsion resulted.

Comparative Example A

A mixture of 1.46 parts Span 60 (sorbitan monostearate) and 1.54 parts Tween 40 (polyoxyethylene(20) sorbitan monopalmitate) was warmed with a water bath at 60° C. to melt the solid surfactant. The mixture was stirred with a mechanical stirrer at 1400 rpm. To this stirred mixture was added 40 parts of 2-(3,4-epoxycyclohexyl) ethyltriethoxysilane and the speed was increased to 2400 rpm. To this mixture was added 56.5 parts of water with constant stirring to give a white emulsion. Germaben II, 1 part, was added as a biocide. The emulsion was then transferred to a Waring blender and blended for several minutes. The emulsion was stable for less than two months.

What is claimed is:

1. A process for preparing an oil-in-water emulsion comprising at least one hydrolyzable silane, at least one emulsifier, and water, comprising the steps of:
   I) dispersing at least one emulsifier in water at a weight ratio of 1.5:1.0 to about 1.0:4.0;
   II) preparing an oil concentrate by mixing said emulsifier and water blend with at least one hydrolyzable silane having the general formula:

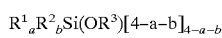

wherein
   $R^1$ is a hetero atom substituted hydrocarbon group;
   $R^2$ is independently an unsubstituted hydrocarbon group;
   $R^3$ is an alkyl, alkoxyalkyl, aryl or aralkyl radical having from 2 to 10 carbon atoms; and
   a is 0 to 3, b is 0 to 2;
   with the proviso that a+b=1,2 or 3; and each R group is cyclic, branched or linear; and
   such that said oil concentrate comprises about 1 part to about 28 parts of said emulsifier and about 1 part to about 55 parts water, per 100 parts of said at least one hydrolyzable silane and
   III) slowly adding water to said oil concentrate until inversion of said oil concentrate occurs.

2. The process of claim 1 wherein said inversion occurs at about 52 to about 59 parts water per 100 parts of said silane.

3. The process of claim 1 wherein said silane is water insoluble.

4. The process of claim 1 wherein said silane has a solubility in water of less than 8.0 weight percent.

5. The process of claim 1 wherein said emulsion is silicone oil-free.

6. The process of claim 1 wherein $R^3$ is selected from the group consisting of ethyl, n-propyl, n-butyl, n-hexyl, n-heptyl, n-octyl, n-nonyl, n-decyl, cyclopentyl, cyclohexyl, cyclo-heptyl, cylcooctyl, isobutyl, sec-butyl, isobutyl, t-butyl, sec-amyl, 4-methyl-2-pentyl, n-butoxy ethyl, methoxy propyl, phenyl, benzyl, ethyl phenyl, and mixtures thereof.

7. The process of claim 1 wherein said hydrolyzable silane has at least one epoxy group.

8. The process of claim 1 wherein said hydrolyzable silane is an epoxy functional silane having the formula:

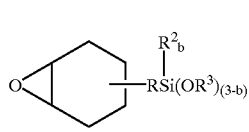

(III)

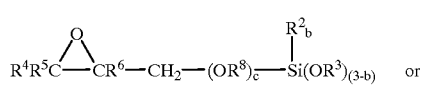

(III)

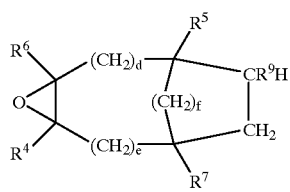

(IV)

R is $(CH_2)_m$ where m is 0 to 6;

$R^2$ is alkyl, alkoxy-substituted alkyl, aryl, or aralkyl having from 1 to 10 carbon atoms;

$R^3$ is alkyl, alkoxy-substituted alkyl, aryl, or alkaryl having from 2 to 10 carbon atoms;

$R^4$, $R^5$, $R^6$, and $R^7$ are hydrogen or alkyl having from 1 to 6 carbon atoms;

$R^8$ is an alkyl group having from 1 to 4 carbon atoms, or aralkyl or aryl having from 6 to 10 carbon atoms;

$R^9$ is $RSi(OR^3)_{3-b}$; and b is 0, 1 or 2;

c,d and e are 0 or 1; and f is 0, 1 or 2.

9. The process of claim 1 wherein said emulsifier is selected from the group consisting of nonionic, anionic, cationic, amphoteric surfactants, and mixtures thereof.

10. The process of claim 1 wherein said emulsifier has an HLB of less than about 4 to about 17.

11. The process of claim 1 wherein said emulsifier is a mixture, said mixture having an HLB of about 4 to about 17.

12. The process of claim 1 wherein said emulsifier is sorbitan monostearate, sorbitan monooleate, or mixtures thereof.

13. The process of claim 1 wherein said pH is about 5.5 to about 8.5.

14. The process of claim 1 wherein said oil-in-water emulsion has an average particle size of said emulsion from about 0.04 to about 1 micron.

15. The process of claim 1 wherein $R^1$ is a monovalent organic radical linked to the Si atom of said silane by an Si—C bond, and which has at least one ether, ester, carbamate, isocyanate, thioether, polysulfide, blocked mercaptan, amide, cyano, epoxy, oximato group, or mixtures thereof, thereon.

16. The process of claim 1 wherein $R^1$ is substituted with a member selected from the group consisting of sulfur, oxygen, halogen, epoxy, methacryloxy, acryloxy, carboxyl, ester, cyano, polyoxyalkylene, and mixtures thereof.

17. The process of claim 1 wherein said oil concentrate has a viscosity of greater than about 100,000 cPs.

18. The process of claim 1 wherein said final emulsion has a viscosity of about 1 to about 18 cPs.

19. The process of claim 1 wherein $R^2$ is selected from the group consisting of allyl, methyl, ethyl, i-propyl, i-butyl, t-butyl, pentyl, cyclohexyl, decyl, dodecyl, octadecyl, octyl, phenyl, benzyl, naphthal, vinyl, tolyl, 2-phenylethyl, propargyl, styryl, n-octyl, and mixtures thereof.

20. The process of claim 1 wherein $R^2$ is selected from the group consisting of methyl, ethyl and phenyl.

* * * * *